United States Patent [19]

Higley

[11] Patent Number: 5,790,793

[45] Date of Patent: Aug. 4, 1998

[54] METHOD AND SYSTEM TO CREATE, TRANSMIT, RECEIVE AND PROCESS INFORMATION, INCLUDING AN ADDRESS TO FURTHER INFORMATION

[76] Inventor: Thomas Higley, 1612 Scarborough Dr., Fort Collins, Colo. 80526

[21] Appl. No.: 417,140

[22] Filed: Apr. 4, 1995

[51] Int. Cl.$^6$ .................................................. H01J 13/00
[52] U.S. Cl. .............................. 395/200.48; 395/200.36; 707/501; 707/513
[58] Field of Search .................. 395/200.04, 200.09, 395/200.16, 200.18, 153, 155, 161, 200.36, 200.48, 200.49, 200.75, 200.76; 707/501, 512, 513

[56] References Cited

U.S. PATENT DOCUMENTS

| | | |
|---|---|---|
| 4,289,930 | 9/1981 | Connolly et al. . |
| 5,167,011 | 11/1992 | Priest . |
| 5,367,621 | 11/1994 | Cohen et al. . |
| 5,379,374 | 1/1995 | Ishizaki et al. ............... 395/155 |
| 5,479,411 | 12/1995 | Klein . |
| 5,483,466 | 1/1996 | Kawahara et al. ............ 395/200.09 |
| 5,530,852 | 6/1996 | Meske, Jr. et al. ........... 395/200.09 |
| 5,544,320 | 8/1996 | Konrad ......................... 395/200.09 |
| 5,572,643 | 11/1996 | Judson ........................... 395/155 |

OTHER PUBLICATIONS

Byte Magazine, "Applying the Internet", Feb. 1992.
Byte Magazine, "Magazines Without Paper", Sep. 1993.
Byte Magazine, "The Web Means Business", Nov. 1994.
Byte Magazine, "The Virtual Storefront", Jan. 1995.
Byte Magazine, "Mosaic: Beyond Net Surfing", Jan. 1995.
Byte Magazine, "Internet with Style", Jan. 1995.
Byte Magazine, "Making the Internet Connection", Jan. 1995.
Byte Magazine, "Internet Publishing Tools Proliferate", Mar. 1995.
Byte Magazine, "Build Your Own WWW Server", Apr. 1995.

Association for Computing Machinery, "Caught in the World Wide Web: Mit Moves Computer Documentation Online", 1994.
Association for Computing Machinery, "Mosaic –Surfing at Home and Abroad", 1994.
IEEE Computer, "Mosaic, HTML, and the World Wide Web", vol. 27, No. 10, Oct. 1994.
Internet Publication, "University of Cambridge Statistical Laboratory", Jul. 1994.
Internet Publication, "New Features in Mosaic 2.0", Dec. 1993.
World Wide Web Frequently Asked Questions. Dec. 9, 1994 From URL http://sunsite.unc.edu/boutell/faq/www$_{13}$faq.html.
Posting to news group Comp.infosystems.www.announce by Luca Mannza <bilbo@crs4.it> on Mar. 10, 1995 describing a WWW interface to POP3. Demo at <URL:http://www.crs4.it/~bilbd WebMailDemo/>.

(List continued on next page.)

*Primary Examiner*—Mark H. Rinehart
*Attorney, Agent, or Firm*—Gibbons, Del Deo, Dolan, Griffinger & Vecchione

[57] ABSTRACT

A method and system for sending and receiving Uniform Resource Locators (URLs) in electronic mail over the Internet. An electronic mail document containing a URL may have several different types. If the message type indicates a URL, when the received URL type document is read or browsed using a multimedia Internet browser, the URL is looked up so that the information corresponding to the URL is displayed without necessarily displaying any portion of the received message. If the received document is of the Hypertext Markup Language (HTML) type, the document may be displayed and a user may "click" on the URL to look up the information corresponding to the URL. If the received document is of the text type, the text may be converted to the HTML format and the HTML format document displayed so that a user may "click" on the URL in order to look up the information corresponding to the URL without the need to type in the URL address.

41 Claims, 8 Drawing Sheets

OTHER PUBLICATIONS

MHonArc Home Page updated Nov. 17, 1994 and MHonArc software manual published by Earl Hood <ehood@convex.com> Convex Computer Corporation Richardson Texas.

rfc1725, Post Office Protocal –Version 3, Nov. 1994 by J. Myers and M. Rose.

rfc1522, MIME (Multipurpose Internet Mail Extensions) Part Two: Message Header Extensions for Non–ASCII Text, Sept. 1993 by K. Moore.

rfc1521, MIME (Multipurpose Internet Mail Extensions) Part One: Mechanisms for Specifying and Describing the Format of Internet Message Bodies, Sep. 1993 by N. Borenstein, Bellcore and N. Freed.

Managing Internet Information Services; World Wide Web, Gopher, FTP and more; O'Reilly & Associates, Inc. pp. 357–359.; Dec. 1984.

Tricks of the Internet Gurus; Unlock the Secrets and Tricks Used by Internet Experts; Sams Publishing, 1994; pp. 257–270.; 1994.

The World Wide Web; Everthing You Need to Master the Web!; John December & Neil Randall; pp. 180–189 (Part I) and pp. 276–280 (Part II); 1994.

Netscape Communications Corp.: "Description of Netscape 1.0"; Mountain View, Calif., 1994.

Berners–Lee, T. et al.; "Hypertext Markup Language (HTML)"; Internet Draft, IIIR Working Group, Jun. 1993.

Baker, S.; "Hypertext browsing on the Internet"; UNIX Review v12 n9 p. 21(6); USA, Sep. 1994.

Snyder, J.; "Taming the Internet"; Macworld v11 n12 p. 114(4); USA, Dec. 1994.

"Leveraging E–Mail", PC Magazine, May 16, 1995, pp. 241, 244 and 245.

```
601   From: catalogdist<catdist@zzz.com>
602   Message_id: <9602030251.AA22346@zzz.com>
603   Subject: Astronomy Catalog
604   To: tom@aaa.bbb.ccc.com
605   Date: Thu. 2 Feb 1995 19:51:47-0700 (MST)
606   Mime-Version: 1.0
607   Content-type: url/pointer; charset=US-ASCII
608   Status: RO
609
610   See: <A HREF-"HTTP:///zzz.com/~web/catalog/spring95.html">The Catalog</A>
611
612   Summay: A galaxy of over 10000 great astronomical things!
613
614   Attached: Text
615
616   If you are not using the Hypertext Mailer option for a multimedia
617   internet browser and would like to recieve a copy of our catalog by
618   email, write us at freecatalog@zzz.com and put the word subcribe in
619   the body of the message. And thanks for giving us a try.
```

FIG. 7

```
701    From: A.User<auser@zzz.com>
702    Message-Id: <9502030251.AA22346@zzz.com>
703    Subject: Astronomy Catalog
704    To: tom@aaa.bbb.ccc.com
705    Date: Thu, 2 Feb 1995 19:51:47-0700 (MST)
706    Mime-Version: 1.0
707    Content-Type: html/text
708    Status: RO
709
710    <HTMl>
711    <HEAD>
712    <TITLE> Astronomy catalog </TITLE>
713    </HEAD>
714
715    <BODY>
716
717    <h1>Summary</h1> A galaxy of over 10000 great astronomical things!
718
719    <h1> The catalog</h1>
720    URL: <A HREF="HTTP://zzz.com/~web/catalog/spring95.html">The catalog</A>
721
722    If you are not using the Hypertext Mailer option for your multimedia
723    internet browser and would like to recieve a copy of our catalog by
724    email, mail to freecatalog@zzz.com and put the word subscribe in the
725    body of the message. And thanks for giving us a try.
726
727    </BODY>
728    </HTML>
```

FIG. 8

```
801   From: A. User<auser@zzz.com>
802   Message-Id: <9502030251.AA22346@zzz.com>
803   Subject: Astronomy Catalog
804   To: tom@aaa.bbb.ccc.com
805   Date: Thr, 2 Feb 1995 19:51:47-0800 (MST)
806   Mime-Version: 1.0
807   Content-Type: text/plain
808   Status: RO
809
810   Tom,
811        I wish I could get an astronomy catalog like you have. I
812   especially liked their section of mirror blanks. I can't wait to
813   grind my own 30 foot mirror. How many years did it take you?
814
815        Thanks,
816             A.
817
818
819   BTW: the home page for that freelance pagoda designer is:
820
821   HTTP://zzz.com/~pagoda
```

FIG. 9

```
901  </BODY>
902  </HTML>
903
904  <HTML>
905  <HEAD>
906  <TITLE> Astronomy catalog </TITLE>
907  </HEAD>
908
909  <BODY>
910
911  <PRE>
912  From: A. User <auser@zzz.com>
913  To: tom@aaa.bbb.ccc.com
914  Date: Thu, 2 Feb 1995 19:51:47-0900 (MST)
915  </PRE>
916
917  Tom,
918      I wish I could get an astronomy catalog like you have. I
919  especially liked their section of mirror blanks. I can't wait to
920  grind my own 30 foot mirror. How many years did it take you?
921
922          Thanks,
923              A.
924
925
926  BTW: the home page for that freelance Pagoda designer is:
927
928  <A HREF-HTTP://zzz.com/~pagoda>pagoda</A>
929  </BODY>
930  </HTML>
```

FIG. 10

METHOD AND SYSTEM TO CREATE, TRANSMIT, RECEIVE AND PROCESS INFORMATION, INCLUDING AN ADDRESS TO FURTHER INFORMATION

BACKGROUND OF THE INVENTION

1. Field of the Invention

The present invention relates to computer systems and more particularly to computer network communications such as electronic mail and a system and method for transmitting and browsing preformatted information on computer networks. The invention is more particularly related to applying these methods and systems to Internet electronic mail and a multimedia browser.

2. Discussion of the Background

Recently, and more particularly in the last two years, growth in the use of the Internet has been explosive. Much of the recent growth is attributable to the popularity of the World Wide Web (WWW), originally developed between 1989 and 1991 by CERN, the European Particle Physics Institute on Geneva, Switzerland, and the more recent development of a software program called "Mosaic." Mosaic is a multimedia, hypertext linked browser for the Internet. Most of the multimedia communication for Mosaic is handled using the Hypertext Transfer Protocol (HTTP) and files or formatted data using the Hypertext Markup Language (HTML). This format provides for a mingling of text, graphics, video, sound and hypertext links by "tagging" a text document using HTML. Data encoded using HTML is often referred to as an "HTML document," an "HTML page" or a "home page". These documents and other Internet resources may be accessed across the network by means of a network addressing scheme. These addresses, as used by Mosaic, are referred to as Uniform Resource Locators (URLs).

Since the development in 1993 of Mosaic by the National Center for Supercomputing Applications at the University of Illinois in Urbana—Champaign, Ill. (NCSA), numerous other implementations of the Internet browser have been developed including but not limited to Netscape, Cello and Lynx. These applications are generically referred to as Multimedia Internet Browsers (MIBs) in this writing. Although this writing may refer specifically to Mosaic by name, this shall not limit the scope of the invention but serves merely as an example of the class of MIBs in general.

The present inventor noticed that URLs are being referenced with increasing frequency in electronic mail messages. However, a URL in a typical mail message provides the user with no easy way to review the information stored at the URL address. To see the information, the reader of the electronic mail message needs to type the URL into a separate MIB browsing program to access the information. The present inventor has noticed that Mosaic, and all of the known MIB implementations suffer from a serious common deficiency. As "passive" browsers of data, they access or "pull" data from the Internet by use of various network addressing schemes. They do not allow for the active sending of network addresses (and corresponding hypermedia documents) to the users of MIBs. That is, they do not "push" data that is on the Internet to users, nor do the browsers as currently conceived and implemented allow for the receiving of such pushed data.

On the other hand, some electronic mailers do handle multimedia, but none of the known implementations merge the send/receive paradigm with a Mosaic-like browser tool. Furthermore, with a single limited exception no known implementations allow for the simple mailing of an address or location reference on the Internet in a manner that allows quick and easy access to the original documents situated at the sender's site (or other sites). It is to be emphasized that each of these deficiencies were ascertained by the present inventor and the determination of these deficiencies constituted part of the inventive process. The single exception, which appeared commercially after the inventor's initial work on the invention, is the sending and receiving of newsgroup messages via a news server, including a rudimentary parsing of a URL in newsgroup messages received via Netscape, a product of Netscape Communications Corp.

INTERNET RELATED PUBLICATIONS

The present invention builds on previously existing Internet ideas such as multimedia browsers, the manner in which electronic mail is handled on the Internet, the Hypertext Markup Language (HTML) and the manner in which Uniform Resource Locators (URLs) work. A significant amount of material describing these features of the Internet is available both through various sites on the Internet and through published resources. A list of resources explaining various features on which the present invention builds is set forth below. Each of the below publications is incorporated herein by reference.

The Mosaic Handbook, from O'Reilly. Information also available at URL http://gnn.com/ora/.

The World Wide Web Unleashed, from Sam's Publishing, by John December and Neil Randall.

Spinning the Web: How to Provide Information on the Internet, from Van Nostrand Reinhold, by Andrew Ford.

Teach Yourself Web Publishing with HTML in a Week, from Sam's Publishing by Laura Lemay.

The HTML Manual of Style, from Ziff-Davis Press, by Larry Aronson.

RFCs are "requests for comments" on various features of the Internet. These requests for comments are draft standards setting forth various information and protocols used on the Internet. The following RFCs are relevant to the present invention and incorporated herein by reference.

rfc 1521 DS, by N. Borenstein, and N. Freed, entitled "MIME (Multipurpose Internet Mail Extensions) Part One: Mechanisms for specifying and describing the Format of Internet Message Bodies", Sep. 23, 1993.

rfc 1522 DS, by K. Moor, entitled "MIME (Multipurpose Internet Mail Extensions) Part Two: Message Header Extensions for Non-ASCII Text, Sep. 23, 1993.

rfc 1523 I, by N. Borenstein, "The Text/Enriched MIME Content-type", Sep. 23, 1993.

rfc 1524 I, by N. Borenstein, "A User Agent Configuration Mechanism For Multimedia Mail Format Information", September 1993.

rfc 1725, by J. Myers, M. Rose, "Post Office Protocol—Version 3", November 1994.

At the time of this writing, information on these and other rfcs pertaining to the Internet was available through a World Wide Web Browser at http://www.cis.ohio-state.edu/htpin/rfc-index.html. Further, other online information explaining the operation of the Internet is accessible at numerous sites via the Internet, and such information can also be viewed by selecting the desired item from a menu in the browser program "Netscape."

SUMMARY OF THE INVENTION

Accordingly, it is an object of this invention to provide a new and useful manner of encoding, transmitting, receiving, and decoding information over a network. It is a further object of this invention to provide a new, useful and efficient manner of transmitting Uniform Resource Locators (URLs) over the Internet so that the receiver of the URL can quickly and easily view the information corresponding to the URL, though the invention is not limited to the Internet as the network or medium by or through which these methods and systems are used.

These and other objects of the invention are accomplished by a new computer implemented method and computer system which transmits a document including a Uniform Resource Locator (URL) from a transmitting station to a receiving station. The receiving station determines the "type" of the received document and looks up the URL message over the Internet and displays the corresponding data, displays a Hypertext Markup Language (HTML) document and allows the user to dereference or look up the URL, or converts the received document which may be in a text form to an HTML form, displays the HTML form of the document, and allows the user to dereference the URL.

An important feature and advantage of the invention is that the received document is not necessarily an actual copy of the information from the URL but is the address of the location of the desired information. This allows the user to look up or receive a copy of a "living" catalog at a merchant's site on the network. This also allows the catalog to be updated so that the person looking up the URL will always have access to the latest information. The present invention uses electronic mail techniques, methods and systems in a manner that changes URLs and their uses from being static documents which need to be selected by the user to be received, to documents that are dynamic, having a new mobility as the sender desires.

BRIEF DESCRIPTION OF THE DRAWINGS

A more complete appreciation of the invention and many of the attendant advantages thereof will become better understood when referring to the accompanying drawings wherein.

DETAILED DESCRIPTION OF THE PREFERRED EMBODIMENTS

Figure 1:
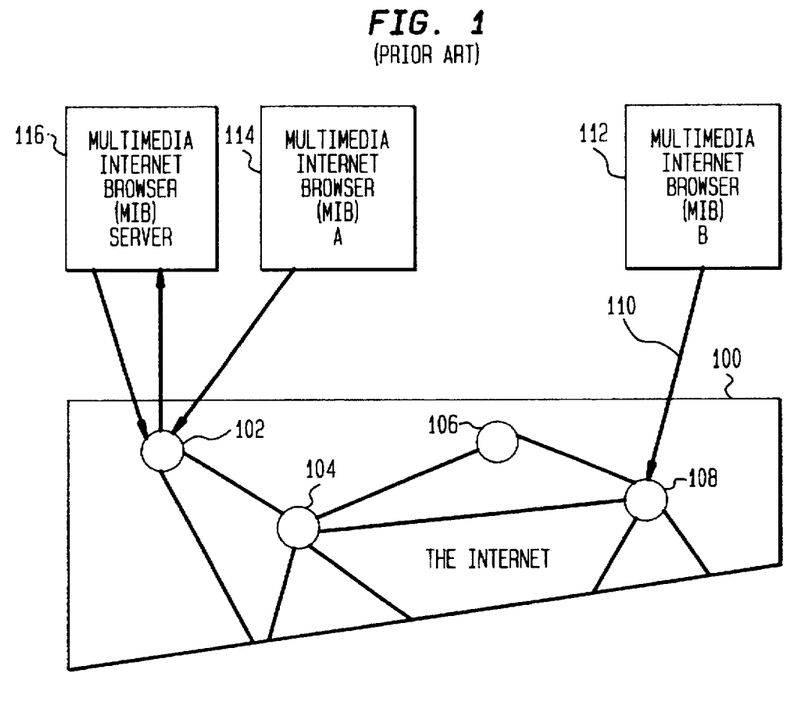
FIG. 1 illustrates a block diagram of a conventional network of machines supporting a pair of Multimedia Internet Browsers (MIBs) and a MIB server.

Referring now to the drawings, and more particularly to FIG. 1 thereof, there is illustrated a block diagram of two multimedia browsers 112 and 114 and a multimedia Internet browser server 116 connected to the Internet 100. The Internet is generally designated by 100 and includes machines 102, 104, 106 and 108. Machine 108 supports a Multimedia Internet Browser B 112 and through connection 110 may access information both on its host machine 108 and via the network 100 at other machines, such as 102, that support a MIB server 116. The server may also allow the execution of local MIB A 114. Although protocols between machines are often of the known TCP/IP variety, any protocol may be used. It is only important that communications be established between the various computers and elements of the network.

Requests for documents and information by the user from MIB 112 are transmitted via standard network protocols to server 116 on the network. It is known in the art how to use standard formats for the addressing of document and information on the network served by a MIB server. These addresses are referred to as Uniform Resource Locators (URLs).

Connection 110 between browser 112 and host 108 may be either by direct connection to a network transport protocol server on the host 108 or may be by some intermittent connection such as a phone line and the Serial Line Internet Protocol (SLIP), Point to Point Protocol (PPP) or other protocols. Accordingly, it is possible to "browse" documents and information by browser A 114 locally by accessing information on server 116 or browser B 112 may remotely access information on server 116.

Figure 2:
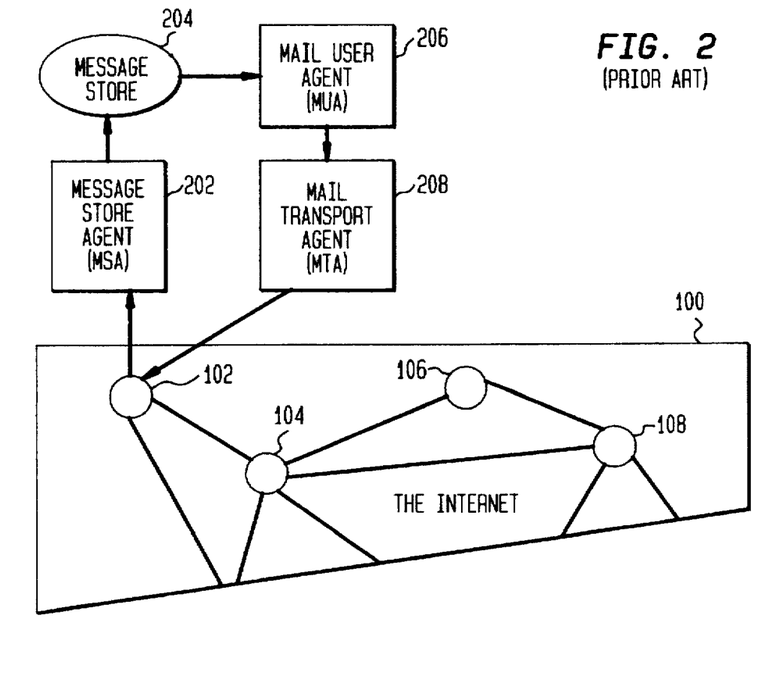
FIG. 2 illustrates a conventional network of machines with a single machine supporting classical electronic mail communications.

FIG. 2 illustrates a classical electronic mail configuration running on and connected to the machine 102. A Message Store Agent (MSA) 202 collects incoming mail and places it in the message store 204. The Mail User Agent (MUA) 206, often a separate program, reads the messages stored in the message store 204 and presents an interface to the user. When the user wishes to transmit mail, the message is composed using the Mail User Agent 206 and passed to a Message Transport Agent (MTA) 208 that sees that the mail is correctly addressed and packaged for transport on the network 100.

Figure 3:
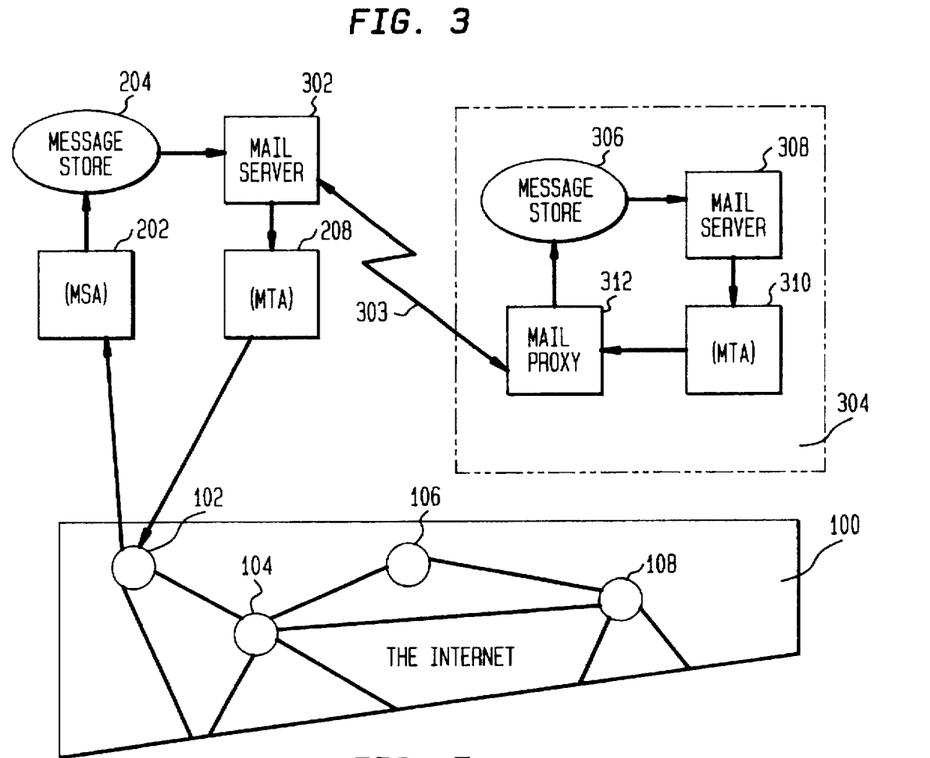
FIG. 3 illustrates a conventional client/server mail configuration running on a pair of machines, one of which is continuously connected to the Internet and the other is intermittently connected.

FIG. 3 illustrates how classical electronic mail is run over an intermittent connection 303 to a machine 304 that is not continuously connected to the network. This type of system may use protocols as described in Post Office Protocol—Version 3 (POP3), as set forth in rfc 1725, November 1994, which is incorporated herein by reference. The system of FIG. 3 is similar to the system of FIG. 2 except that the Mail User Agent 206 in FIG. 2 is replaced with the Mail Server 302 in FIG. 3 which services requests over an intermittent line 303 from a Mail Proxy 312. At the request of the Mail Proxy 312, a copy of the mail in the message store 204 is copied to the message store of the off-net machine 304. The Mail Server 308 then proceeds as in FIG. 2 and the elements in the server 304 including the Message Store 306, and the Mail Transport Agent 310 function as described with respect to these elements set forth in FIG. 2. Outgoing mail may be formatted for delivery on the off-net machine 304 and delivered via Mail Proxy 312 to the Mail Server 302 for delivery to the network. Transactions between the off-net machine 304 and the Mail Server 302 on a machine which is continuously on the net occur only when the connection is active.

Figure 4:
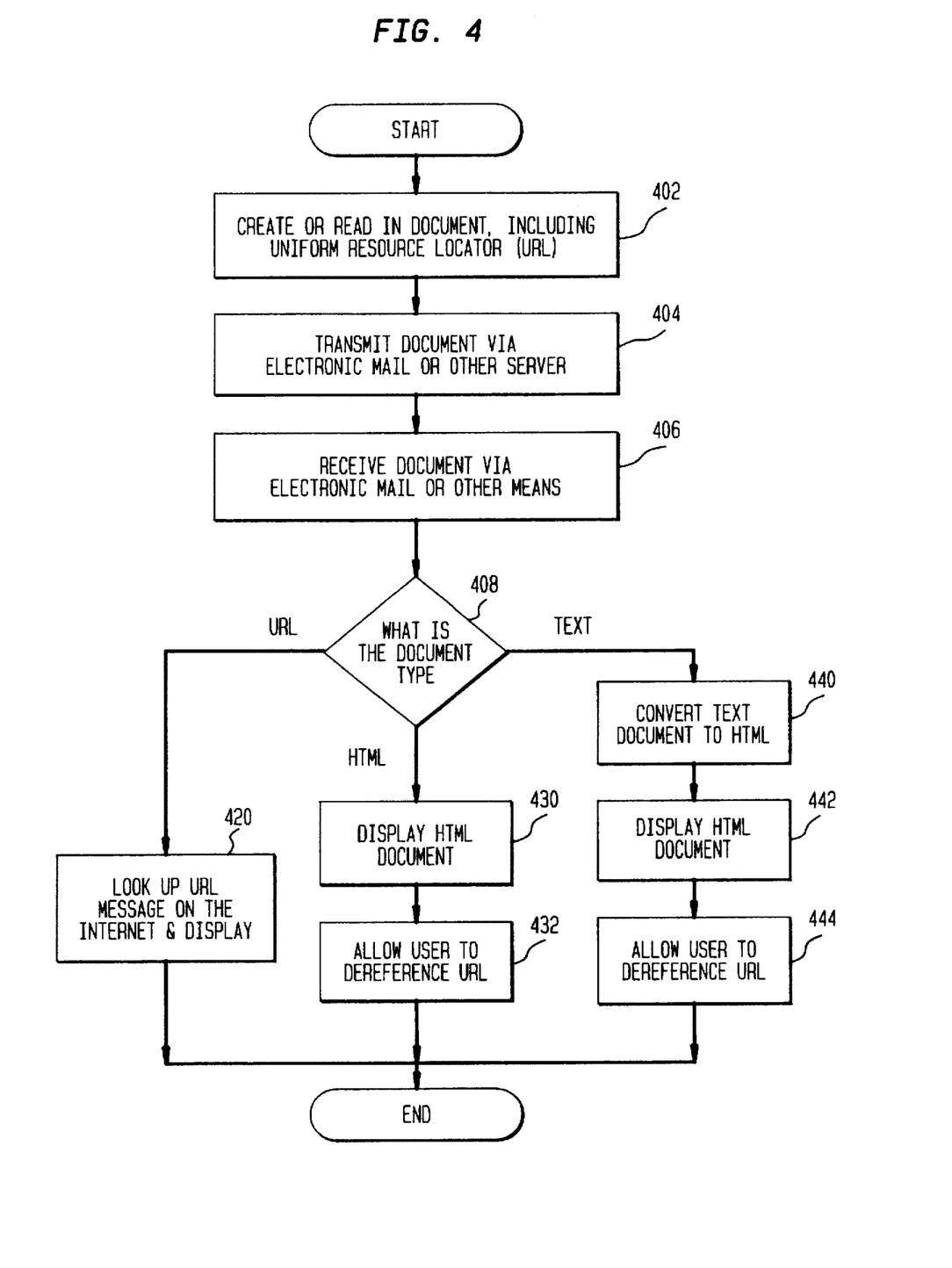
FIG. 4 illustrates a process performed by the present invention.

FIG. 4 illustrates a flow chart which contains the process used by the present invention. After starting, step 402 creates or reads in a document which is identified as to location by a Uniform Resource Locator (URL). The document may contain a text message and the URL, be encoded in HTML or not be encoded in HTML, contain simply the URL, and/or contain a header indicating the type of message such as a text message, HTML message, or URL message which indicates that the message contains a URL. A feature of the invention is that the data corresponding to the URL need not be encoded and transmitted. In many instances, only the URL address is encoded and transmitted. This document including the URL is then transmitted as electronic mail via an electronic mail or other server in step 404 using conventional electronic mail techniques. The creating and transmitting steps actually create and transmit electrical signals representing an electronic mail message for subsequent viewing by a receiver.

Step 406 then receives the transmitted document via electronic mail. This receipt of the document may be performed using known electronic mail techniques. Step 408 then determines the type of the received document. For purposes of illustration, the present invention is described as operating with three types of received electronic mail, but of course, other types of electronic mail and received messages and information may be used with the present invention.

A first type which the received document/electronic mail/ message might embody is a "URL" type. This means that the message is essentially a pointer to another location or address on the Internet. When a URL type message is received over the network by the present invention, the URL contained in the message would automatically be looked up on the Internet and displayed without displaying the actual message that delivered the URL. This action of looking up a URL in a URL type message is called dereferencing the URL message. The user may, optionally, choose not to dereference the URL message and see the raw transmission data. Step 408 may determine the message type "URL" simply by looking at a header in the message or may scan the message for specific syntax which indicates the message type.

A second type of message which step 408 may determine exists is the "HTML" type message. As with the first type, this type may be determined by either looking at the message header or the content of the message. In this case, the received document is displayed in step 430 and the user may dereference the URL in step 432. This simply means that the user may "click" on the URL in a document being displayed by a MIB so that the information of the URL is looked up, retrieved over the Internet or other network, and displayed by the receiver's multimedia browser. It is possible to have the URL automatically accessed, if desired, without the need to "click" on the URL.

Alternatively, if step 408 determines that the received document type is text, a third type, step 440 converts the text document to the HTML format. The manner of performing such conversion is known in the art, and an example of such programs which are commercially available is the program called "MHonArc", incorporated herein by reference, by Earl Hood at the electronic mail Internet address ehood@convx.com. This program is an Internet mail-to-HTML converter which is a successor of "mail2html," which is a mail-to-HTML converter. When the present invention converts the message to HTML format, it is not necessary to include the data corresponding to a URL in the converted document; the URL may be left in URL format. Next, step 442 displays the HTML document using a MIB and step 444 allows the user to "click" or dereference the URL in order to access the information at the URL. The process of the present invention then ends. It is to be noted that translation (if performed), dereferencing or looking up the data corresponding to the URL, and displaying are seamlessly performed by a single application without the need for separately executing different and/or separate applications.

The flowchart of FIG. 4 illustrates a decision step 408. However, if the message is known to always be of a specific type, it may not be necessary to determine the message type and only the steps corresponding to the specific type need to be performed. Further, the steps necessary to display, convert, and dereference the URL may be considered decoding steps.

Figure 5:
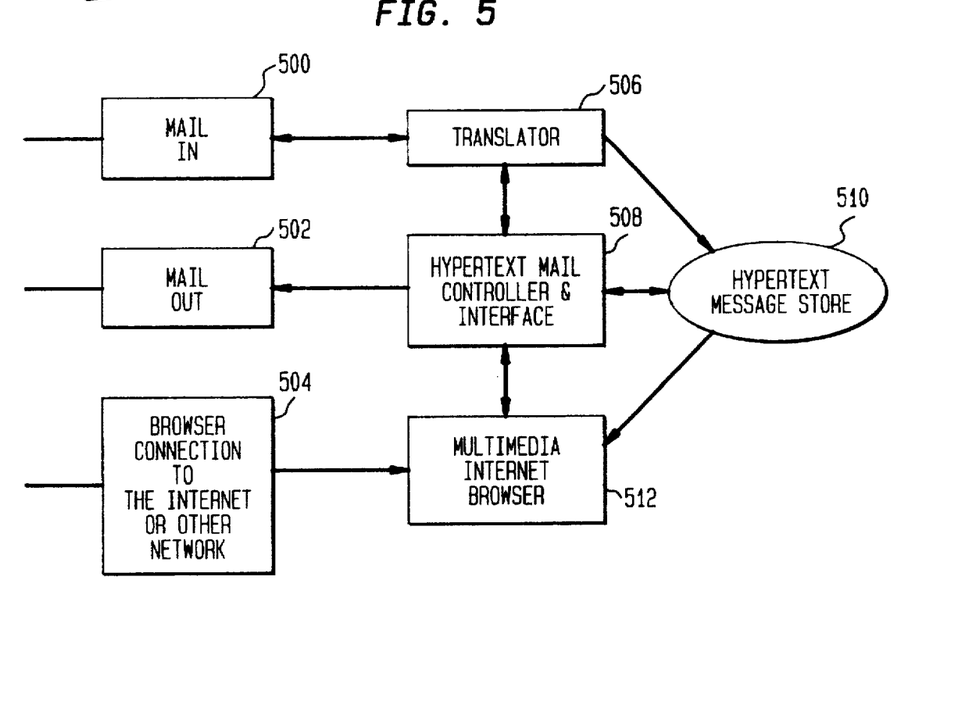
FIG. 5 illustrates a block diagram of the components used to embody the invention.

FIG. 5 illustrates a block diagram of the components used to embody the invention. In FIG. 5, the connections to the Internet are illustrated as Mail In 500 which receives mail from the Internet, Mail Out 502 which sends electronic mail over the Internet, and a browser connection to the Internet 504 which allows a MIB to access URLs over the Internet. The Mail In 500 can be, but is not limited to, a Mail Proxy as illustrated in FIG. 3, a Message Store Agent 202 as illustrated in FIG. 2, or the Message Store 204 illustrated in FIG. 2. The Mail Out 502 can be, but is not limited to, a Mail Proxy, as illustrated in FIG. 3, or a Mail Transport Agent as illustrated in FIG. 2 or 3. The browser connection to the Internet or other network 504 is similar to the browser connection 110 in FIG. 1 that allows the Multimedia Internet Browser 512 to access the network. The Hypertext (HT) Mail Controller 508 operates by at least supplying a user interface, may implement a user interface via facilities supplied by the MIB 512, or may actually be part of the executable that is the MIB 512. The block diagram of FIG. 5 has illustrated the functions as being separate, although the hardware can be contained in one device without being implemented as separate functional blocks.

In FIG. 5, as electronic mail arrives via the Mail In connection 500, a translator 506 examines a header or markers in the data content of the mail to determine the form of the mail. Conventional Internet E-mail transmitted according to the MIME standard utilizes a "type" and the present invention additionally allows the types to be at least one of "URL", "HTML", or "text." If the mail is not in the HTML format and is to be translated or converted to the HTML format, for example when the type of the incoming mail is "text", the translator 506 will translate the mail and store the incoming mail in the Hypertext Message Store 510. The mail can then be viewed by use of a controller and interface 508 which presents a familiar electronic mail interface to the user, and the use of a MIB 512 acts as the display agent for the HTML. It is not necessary to translate HTML documents, and these types documents may be passed through the translator without any translation. Also, the original type of the received mail may be preserved for use by the controller 508.

The Hypertext Message Store 510 contains, but is not limited to, HTML formatted documents as well as the URL documents explained in the present writing. URL type documents which contain one or more URLs may be displayed by the MIB 512 under the control of the controller and interface 508.

Electronic copies of HTML documents and URL type documents can be mailed (transmitted) from the controller and interface 508 via Mail Out 502. This would allow such actions as mailing of a document of the URL type to a user address or a collection of addresses on the Internet. The document might be, but would not be limited to, any of the following:

(1) the current document being viewed in the MIB 512; (2) a document from a set of documents displayed and maintained by the Hypertext Mail Controller and Interface 508; (3) a document from the HT Message Store 510; or (4) an arbitrary user specified URL. Multimedia editors could be employed to construct messages in HTML and then, with the present invention, either send them in full formatted HTML form or send the URL type document which allows the message to be fetched via remote installations of the present invention on the network.

The present invention satisfies the need of merging electronic communications such as electronic mail and multimedia Internet browsers. The present invention also allows the users of MIBs to receive fully formatted HTML documents as well as other MIB accessible materials in much the same manner as the user would receive electronic mail. Using the present invention, merchants could easily send to their customers world-wide a host of materials, including catalogs, new product information, brochures, manuals and corrections for manuals, support information and other unwieldy documents. Moreover, these materials could be sent via currently established electronic routes without substantial additional investment in hardware. Current HTML already facilitates the use of forms. Soon, secure monetary exchanges will also be available via the Internet. As a result of the present invention, orders, complaints, customer questions and comments and a wide array of other services can all be handled electronically. All this can be accomplished at a fraction of the cost of printed materials, and in a much faster manner than using the post office, courier, and all of the more familiar forms of information exchange. Furthermore, individuals would find their range of expression via electronic mail greatly enhanced.

Figure 6:
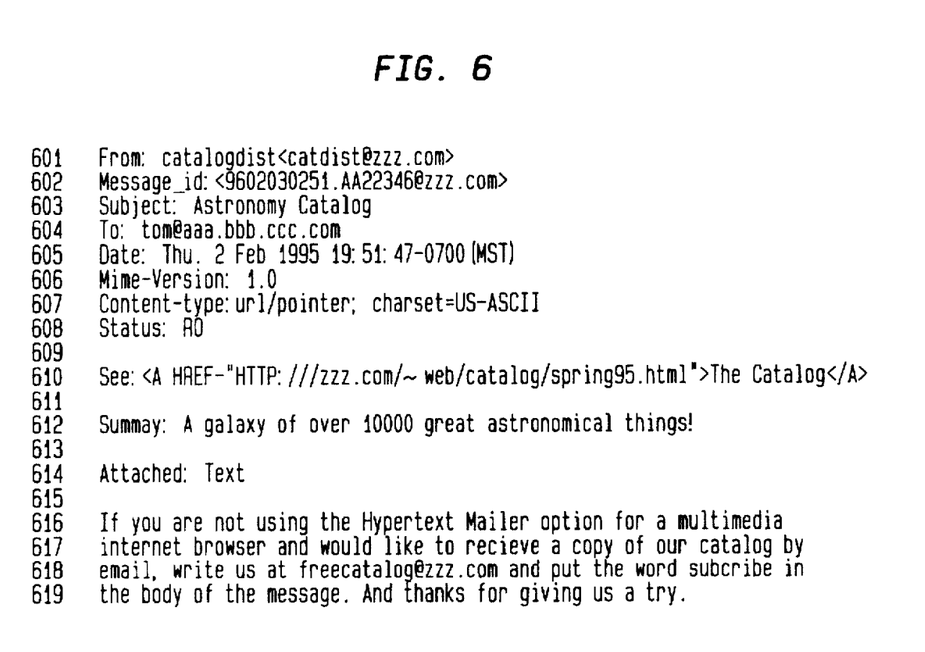
FIG. 6 illustrates an example of an electronic mail format used to transmit addresses (URL typed mail) by the present invention.

FIG. 6 illustrates a possible format of a URL type message. In the example listings contained within the Figures, the first column of numbers are line numbers for convenience of explanation and are not actually present in the data to be transmitted. Lines 601 through 608 are an example of a standard header used for Internet mail. Line 606 shows the use of MIME typing, but should not be construed to limit the present invention to any particular typing scheme. Line 607 marks the mail as of type URL. Line 610 contains the URL that is to be sent. Line 612 contains a summary of to what the URL refers and contains more detail than the hyperlink representation in line 610. Line 614 indicates what follows in the message is text for those receiving the message but who do not have a multimedia mail reader.

If the data in FIG. 6 is mailed to an embodiment of the invention, it would be received as a mail message of URL type. When the Hypertext mail controller used for viewing the URL type message is activated, the URL would be looked up on the Internet and displayed without displaying of the actual message that delivered the URL. This action of looking up a URL from the URL type message is called dereferencing the URL message. The user may, optionally, choose not to dereference the URL message and see the raw transmission.

Figure 7:
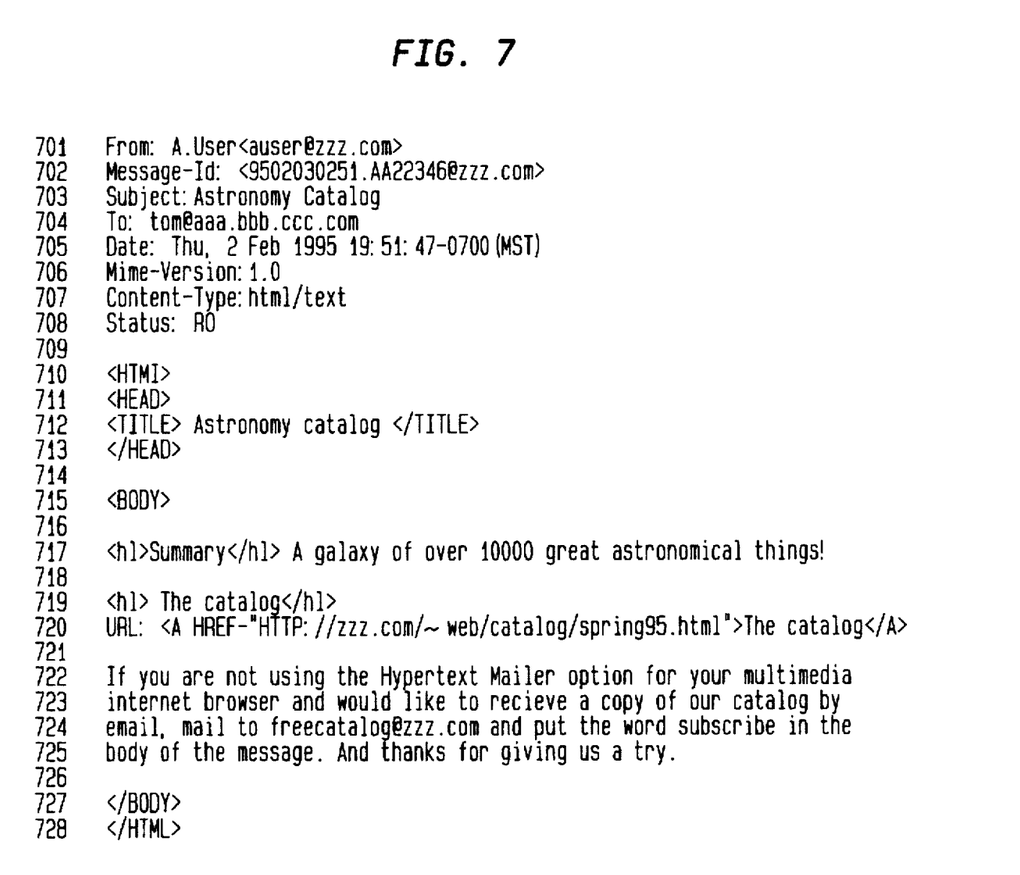
FIG. 7 illustrates another example of an electronic mail format in HTML used to transmit addresses (URL typed mail) by the present invention.

FIG. 7 illustrates a second example of a message which may be used with the present invention. In FIG. 7, the MIME type is HTML in line 707. Line 710 through 727 are all in standard HTML format. The invention, however, can detect that this message contains a URL in line 720 via the tagging of the line with the characters "URL:". The summary is in a line formatted with the HTML h1 tag and the title summary. The text of the message is easily readable by a MIB and any standard mailer. MIME-based mailers may be able to display the HTML code via a MIB as an external viewer. When the file of FIG. 7 is received by a machine operating according to the process of the present invention, the message is received and if a user "clicks" when a pointing device such as a mouse is pointing to the URL, the information relating to the URL would be retrieved via the Internet and displayed (e.g., dereferenced). Alternatively, the URL may automatically be displayed without user intervention. FIGS. 6 and 7 are illustrative and should not be considered the only possible formats or URL typed messages or manners of encapsulating a URL for delivery via electronic means.

Figure 8:
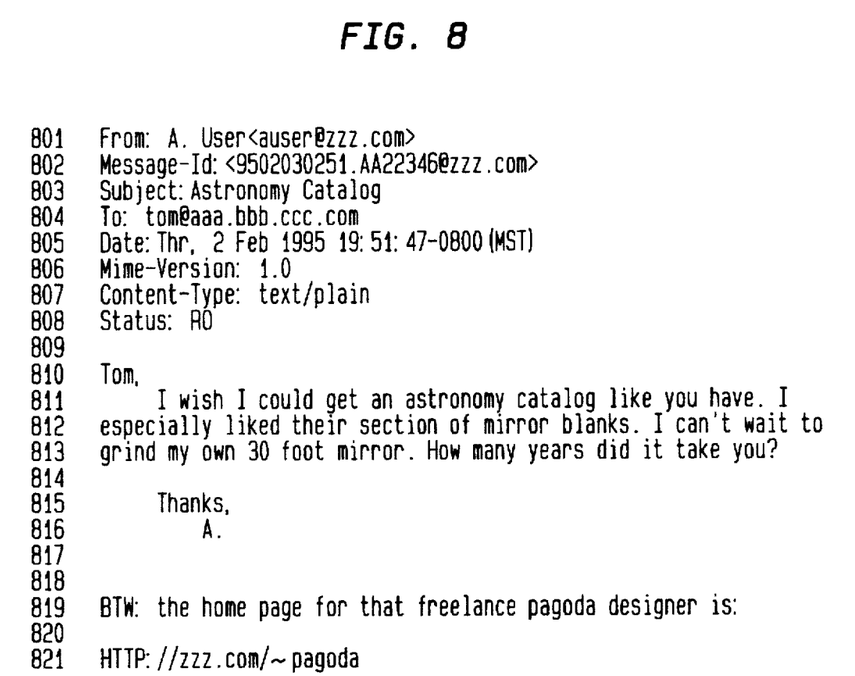
FIG. 8 illustrates a text type mail which is used by the present invention.
Figure 9:
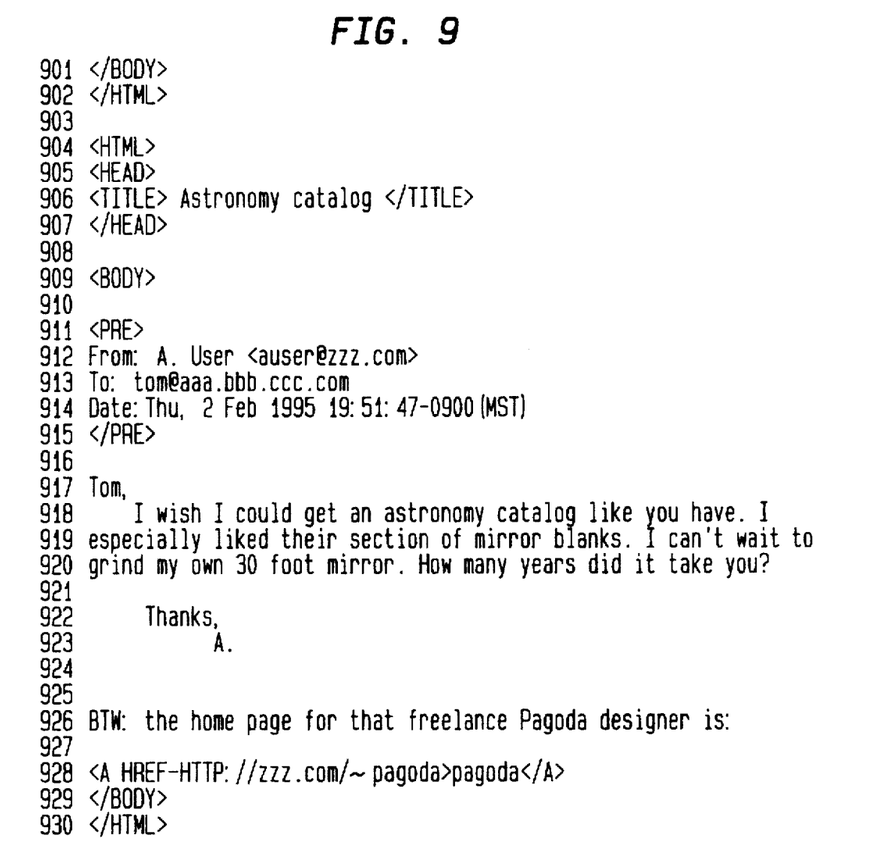
FIG. 9 illustrates the document illustrated in FIG. 8 translated to an HTML style document.

FIG. 8 illustrates a conventional plain text type of electronic mail message. When such a message is retrieved by the present invention, a translator may translate the text message to an HTML format as illustrated in FIG. 9. The user may then "click" on line 928 of the translated document illustrated in FIG. 9 so that the URL at line 928 is easily looked-up on the Internet or dereferenced without the need for a user to type in the address HTTP://zzz.com/~pagoda.

Figure 10:
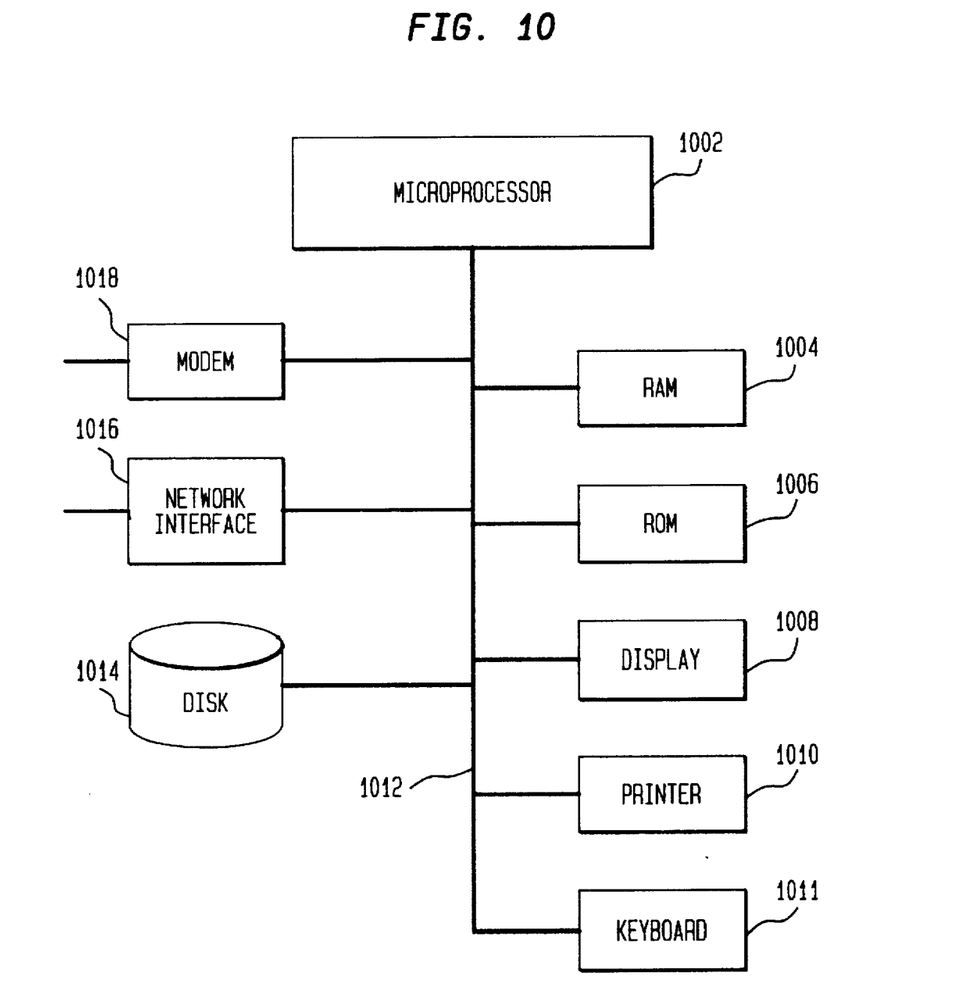
FIG. 10 illustrates the components of a computer which may be used to implement the present invention.

FIG. 10 illustrates an exemplary hardware diagram of the structure used to implement the present invention. This structure may correspond to the machines illustrated in FIGS. 1–3 and 5. In FIG. 10, there is a microprocessor 1002, a RAM 1004, a ROM 1006 which may be used to store the electronic instructions used to execute the process of the invention, a display 1008 such as a CRT or a LCD display, a printer 1010, and a keyboard or other input device 1011, each of which is connected to a system bus 1012. Also connected to the bus 1012 are a disk 1014 which may store the electronic instructions used to execute the invention, a network interface 1016 which may be directly connected to the network, and modem 1018 which may be connected to the network via a telephone line.

This invention may be conveniently implemented using a conventional general purpose digital computer, as illustrated in FIG. 10, and programmed according to the teachings of the present invention, as will be apparent to those skilled in the art. Appropriate software coding can readily be prepared by skilled programmers based on the teachings of the present disclosure, as will be apparent to those skilled in the software art.

The invention may also be implemented by the preparation of application specific integrated circuits or by interconnecting an appropriate network of conventional component circuits, as will be readily apparent to those skilled in the art.

The present invention also includes a computer program product which is a storage medium including instructions which can be used to program a computer to perform a process of the invention. The storage medium can include, but is not limited to, any type of disk including floppy disks, optical disks, CD-ROMs, and magneto-optical disks, ROMs, RAMs, EPROMs, EEPROMs, magnetic or optical cards, or any type of media suitable for storing electronic instructions. As an apparatus embodying the present invention is operated, the device processes signals which are physical phenomena and control the device in an appropriate manner so that the desired results of the invention are achieved.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A method of communicating between computers, comprising the steps of:

creating a message at a first computer, said message including a reference to a predetermined location;

transmitting, by the first computer, said message to a second location; and receiving said message by a computer at the second location;

decoding said message by the computer at the second location by retrieving data from the predetermined location, automatically by a single application, without requiring user interaction, into the computer at the second location.

2. A method according to claim 1, wherein:

said step of creating a message creates the message using Hypertext Markup Language (HTML); and said step of decoding said message decodes the message using an HTML viewer.

3. A method according to claim 1, wherein:

said step of creating a message creates the message without using a Hypertext Markup Language (HTML); and said step of decoding said message includes:

decoding the message by translating the message to the HTML; and displaying, using a HTML viewer, said message which has been translated to the HTML.

4. A method according to claim 1, wherein:

said reference to a predetermined location is a Uniform Resource Locator (URL) and said step of creating creates the message without including data corresponding to the predetermined resource referenced by the URL.

5. A method according to claim 4, wherein said decoding step automatically retrieves the data from the predetermined location when a user decodes the message without the user requesting the retrieval of the data corresponding to the URL.

6. A method according to claim 1, wherein said transmitting step transmits the message over an Internet connection.

7. A method according to claim 1, wherein said step of creating creates the message so that the reference to a predetermined location corresponds to at least one of company information, a catalog, new product information, a manual, a correction to the manual, an order, complaint information, and a questionnaire.

8. A method according to claim 1, wherein said decoding includes displaying the message and the data from the predetermined location without running an application other than said single application and without running a separate translation program.

9. A method according to claim 1, wherein said step of creating a message creates said message to be an electronic mail message and said transmitting steps transmits said message over the Internet.

10. A method of processing, by a computer at a second location, a message created by a computer at a first location, the message including a reference to a predetermined location, and which was transmitted to the computer at the second location, comprising the steps of:

receiving said message by the computer at the second location;

decoding said message by the computer at the second location by retrieving data from the predetermined location, automatically by a single application, without requiring user interaction.

11. A method according to claim 10, wherein:

said message is encoded using a Hypertext Markup Language (HTML); and said step of decoding said message decodes the message using an HTML viewer.

12. A method according to claim 10, wherein:

said message is encoded without using a Hypertext Markup Language (HTML); and said step of decoding said message includes:

decoding the message by translating said message to the HTML; and displaying said message which has been translated to the HTML using an HTML viewer.

13. A method according to claim 10, wherein:

said reference to a predetermined location is a Uniform Resource Locator (URL) and said message is created without including data corresponding to the predetermined resource referenced by the URL.

14. A method according to claim 13, wherein said decoding step automatically retrieves the data from the predetermined location when a user decodes the message without the user requesting the retrieval of the data corresponding to the URL.

15. A method according to claim 10, wherein said receiving step receives the message from an Internet connection.

16. A method according to claim 10, wherein said message having the reference to the predetermined location has the reference to the predetermined location corresponding to at least one of company information, a catalog, new product information, a manual, a correction to the manual, an order, complaint information, and a questionnaire.

17. A method according to claim 10, wherein said decoding includes displaying the message and the data from the predetermined location without running an application other than said single application and without running a separate translation program.

18. A method according to claim 10, wherein said receiving step receives the message as an Internet electronic mail message.

19. A computer implemented method for transmitting a message to a receiving computer which examines a type of the message and looks up an address to a predetermined location contained within the message if the message is determined to be of a type which indicates that the message contains an address, comprising the steps of:

encoding a message into a format which indicates that a type of the message is of a format which contains an address to a predetermined location and contains the address to the predetermined location without including data corresponding to the predetermined location; and transmitting the encoded message over a network to the receiving computer.

20. A method according to claim 19, wherein said encoding step encodes the message to be of a type indicating the message contains a Uniform Resource Locator (URL).

21. A computer system, comprising:

a first computer; and a second computer connected to the first computer via a network;

said first computer including:

means for creating a message including a reference to a predetermined location; and means for transmitting, by the first computer, said message to a second location;

said second computer including:
  means for receiving said message; and
  means for decoding said message by retrieving data from the predetermined location without a user typing the reference to the predetermined location into the computer at the second location.

22. A computer system according to claim 21, wherein:
said means for creating a message creates the message using a Hypertext Markup Language (HTML); and
said means for decoding said message decodes the message using an HTML viewer.

23. A computer system according to claim 21, wherein:
said means for creating a message creates the message without using a Hypertext Markup Language (HTML); and
said means for decoding said message includes:
  means for decoding the message by translating the message to the HTML; and
  means for displaying, using a HTML viewer, said message which has been translated to the HTML.

24. A computer system according to claim 21, wherein:
said reference to a predetermined location is a Uniform Resource Locator (URL) and said means for creating creates the message without including data corresponding to the predetermined resource referenced by the URL.

25. A computer system according to claim 24, wherein said decoding means automatically retrieves the data from the predetermined location when a user decodes the message in order to read the message without the user requesting the retrieval of the data corresponding to the URL.

26. A computer system according to claim 21, wherein said transmitting means transmits the message over an Internet connection.

27. A computer system according to claim 21, wherein said means for creating creates the message so that the reference to a predetermined location corresponds to at least one of company information, a catalog, new product information, a manual, a correction to the manual, an order, complaint information, and a questionnaire.

28. A computer system according to claim 21, wherein
said decoding is automatic and performed by a single application; and
said decoding means includes means for displaying the message and the data from the predetermined location without running an application other than said single application and without running a separate translation program.

29. A computer system according to claim 21, wherein said means for creating a message creates said message to be an electronic mail message and said means for transmitting transmits said message over the Internet.

30. A computer, located at a second location, for processing a message created by a transmitting computer at a first location, the message including a reference to a predetermined location, said computer comprising:
  means for receiving said message; and
  means, connected to the means for receiving, for decoding said message by retrieving data from the predetermined location without a user of said computer typing the reference to the predetermined location.

31. A computer according to claim 30, wherein:
said message is encoded using a Hypertext Markup Language (HTML); and
said means for decoding said message decodes the message using an HTML viewer.

32. A computer according to claim 30, wherein:
said message received by said computer was encoded without using a Hypertext Markup Language (HTML); and
said means for decoding said message includes:
  means for decoding said message by translating the message to the HTML; and
  means for displaying said message which has been translated to the HTML using an HTML viewer.

33. A computer according to claim 30, wherein:
said reference to a predetermined location is a Uniform Resource Locator (URL) and said message is created without including data corresponding to the predetermined resource referenced by the URL.

34. A computer according to claim 33, wherein said means for decoding automatically retrieves the data from the predetermined location when a user decodes the message without the user requesting the retrieval of the data corresponding to the URL.

35. A computer according to claim 30, wherein:
said means for receiving receives the message from an Internet connection.

36. A computer according to claim 30, wherein said message having the reference to the predetermined location has the reference to the predetermined location corresponding to at least one of, company information, a catalog, new product information, a manual, a correction to the manual, an order, complaint information, and a questionnaire.

37. A computer according to claim 30, wherein:
said means for decoding performs the decoding to be automatic and includes a single application; and
said decoding means includes a means for displaying the message and the data from the predetermined location without running an application other than said single application and without running a separate translation program.

38. A computer according to claim 30, wherein said means for receiving receives the message as an Internet electronic mail message.

39. A computer for transmitting a message to a receiving computer which examines a type of the message and looks up an address to a predetermined location contained within the message if the message is determined to be of a type which indicates that the message contains an address, comprising:
  means for encoding a message into a format which indicates that a type of the message is of a format which contains an address to a predetermined location and contains the address to the predetermined location without including data corresponding to the predetermined location; and
  means for transmitting the encoded message over a network to the receiving computer.

40. A method according to claim 39, wherein said encoding means encodes the message to be of a type indicating the message contains a Uniform Resource Locator (URL).

41. A method of communicating between computers, comprising the steps of:
  sending a message over a network, said message includes at least one reference to a predetermined location at a first computer system;
  receiving said message at a second computer system; and
  decoding said message by retrieving data from said predetermined location automatically, without requiring user interaction.

* * * * *